United States Patent [19]

Beratan

[11] Patent Number: 5,011,907

[45] Date of Patent: Apr. 30, 1991

[54] MOLECULES WITH ENHANCED ELECTRONIC POLARIZABILITIES BASED ON "DEFECT"-LIKE STATES IN CONJUGATED POLYMERS

[75] Inventor: David N. Beratan, S. Pasadena, Calif.

[73] Assignee: The United States of America as represented by the Administrator of the National Aeronautics and Space Administration, Washington, D.C.

[21] Appl. No.: 418,611

[22] Filed: Oct. 10, 1989

[51] Int. Cl.$^5$ .................................................. C08G 6/02
[52] U.S. Cl. .................................... 528/220; 528/222; 528/225; 528/227; 528/228; 528/230; 528/233; 528/236; 528/243; 525/398; 525/401; 525/402
[58] Field of Search ............... 528/220, 222, 225, 227, 528/228, 230, 233, 236, 243; 525/398, 401, 402

[56] References Cited

U.S. PATENT DOCUMENTS

| | | | |
|---|---|---|---|
| 4,208,501 | 6/1980 | Yee et al. .............................. | 526/259 |
| 4,562,141 | 12/1985 | Tieke .................................... | 430/281 |
| 4,615,962 | 10/1986 | Garito ................................... | 430/20 |
| 4,717,762 | 1/1988 | Jenekhe .............................. | 528/251 |
| 4,721,769 | 11/1988 | Rubner ................................. | 528/75 |
| 4,849,500 | 7/1989 | Rubner ................................. | 528/345 |

Primary Examiner—Morton Foelak
Assistant Examiner—Sam A. Acquah
Attorney, Agent, or Firm—Thomas H. Jones; Harold W. Adams; John R. Manning

[57] ABSTRACT

Highly conjugated organic polymers typically have large non-resonant electronic susceptibilities, which give the molecules unusual optical properties. To enhance these properties, "defects" are introduced into the polymer chain. Examples include light doping of the conjugated polymer and synthesis, conjugated polymers which incorporate either electron donating or accepting groups, and conjugated polymers which contains a photoexcitable species capable of reversibly transferring its electron to an acceptor. Such defects in the chain permit enhancement of the second hyperpolarizability by at least an order of magnitude.

23 Claims, 3 Drawing Sheets

MOLECULES WITH ENHANCED ELECTRONIC POLARIZABILITIES BASED ON "DEFECT"-LIKE STATES IN CONJUGATED POLYMERS

ORIGIN OF THE INVENTION

The invention described herein was made in the performance of work under a NASA contract, and is subject to the provisions of Public Law 96-517 (35 U.S.C. 202) in which the Contractor has elected not to retain title.

TECHNICAL FIELD

The invention relates to non-linear optical materials, and in particular, to significantly increasing the electronic second hyperpolarizability of highly conjugated organic polymers to enhance their non-linear optical properties, thereby making many all-optical, ultra-fast devices feasible.

BACKGROUND ART

In the field of non-linear optics, the relationship between the polarization induced in a molecule (p) and the electric field components of incident electromagnetic waves (E) is approximately given by $$p = \alpha \cdot E + \beta \cdot EE + \gamma \cdot EEE + \ldots$$

Since p and E are vector quantities, $\alpha$, $\beta$, $\gamma$, etc., are tensors.

A similar expression can be written for the polarization induced in an ensemble of molecules in the liquid, solid, or gas phase. In this case, with the electric field dipole approximations, the polarization P is written as $$P = \chi^{(1)} \cdot E + \chi^{(2)} \cdot EE + \chi^{(3)} \cdot EEE + \ldots$$

The coefficients $\chi^{(1)}$, etc., are tensors with similar meanings in relation to the molecular quantities, except that they describe the polarization induced in the ensemble.

There are several non-linear effects occurring through $\chi^{(3)}$. These include third harmonic generation (THG), optical bistability resulting from light-intensity-induced changes in the refractive index of the medium in a resonant cavity, and optical phase conjugation, which results from a degenerate four-wave mixing process by which two beams interfere to form a phase grating, and the complex conjugate of the phase front of the incoming beam is created as an outgoing beam. These effects are implemented as optical switching devices, optical modulators, and optical computing elements, for example.

Highly conjugated organic polymers typically have large non-resonant electronic susceptibilities ($\chi^{(3)}$), which give the molecules unusual optical properties. It is desired to enhance these properties.

While some enhancement has been achieved by decreasing the bandgap of the material and increasing the bandwidths, such strategies do not lead to the significant enhancement desired.

STATEMENT OF THE INVENTION

Accordingly, it is an object of the invention to provide highly conjugated organic polymers having large enhancements of the second hyperpolarizability, $\chi^{(3)}$.

It is also an object of the invention to provide materials with switchable second hyperpolarizabilities in which the magnitude and/or sign can be modified in a reversible or irreversible fashion.

In accordance with the invention, introduction of "defects" in highly conjugated organic polymers, on either a permanent or transient time scale, enhances the second hyperpolarizability. By introducing gap states with the appropriate energy, order of magnitude changes in $\chi^{(3)}$ are possible. These states can be produced by light doping of the conjugated polymer (an irreversible process), by synthesis of materials containing donor and/or acceptor groups which interact with the $\pi$-electron system, or by the synthesis of a conjugated polymer which contains a photoexcitable species in conjugation with the polymer which could reversibly transfer its electron to an acceptor.

DETAILED DESCRIPTION OF THE INVENTION

As used herein, $\beta$ denotes the coupling between carbon atoms in a chain, and typically ranges from about 3 to 4 eV. $\beta_1$ is the coupling between orbitals in a single bond, while $\beta_2$, is the coupling between orbitals in a double bond. $\Delta$ is the electron affinity of an isolated functional group (here, X) relative to an isolated carbon atom. $\Delta$ is given in terms of eV, and when divided by $\beta$, yields a dimensionless number.

$\gamma$ is the cubic (second) hyperpolarizability. $\gamma(0)$ is the second hyperpolarizability of ethylene, while $\gamma/N\gamma(0) = \gamma'_{xxxx}$ is the second hyperpolariz-ability density of a polyene, where N is the number of dou-ble bonds in the chain.

Figure 2A:
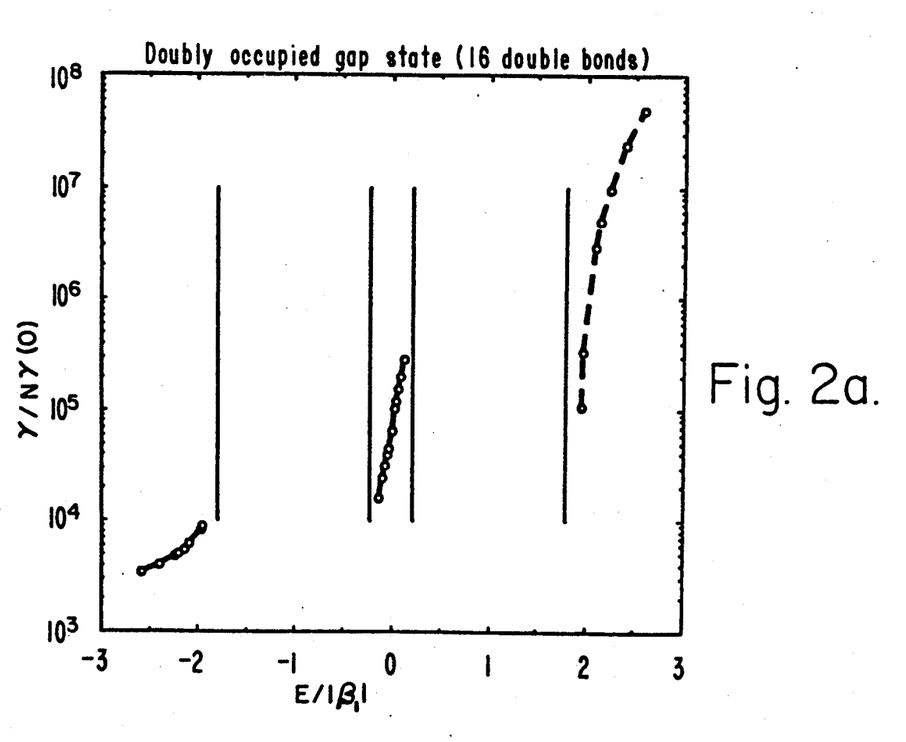
FIGS. 2a–c are plots, on coordinates of hyperpolarizability density and energy of the gap state, of the dependence of the hypepolarizability density as a function of the energy of the most localized of the three states split from the bands by mixing them with the central atom.
Figure 2B:
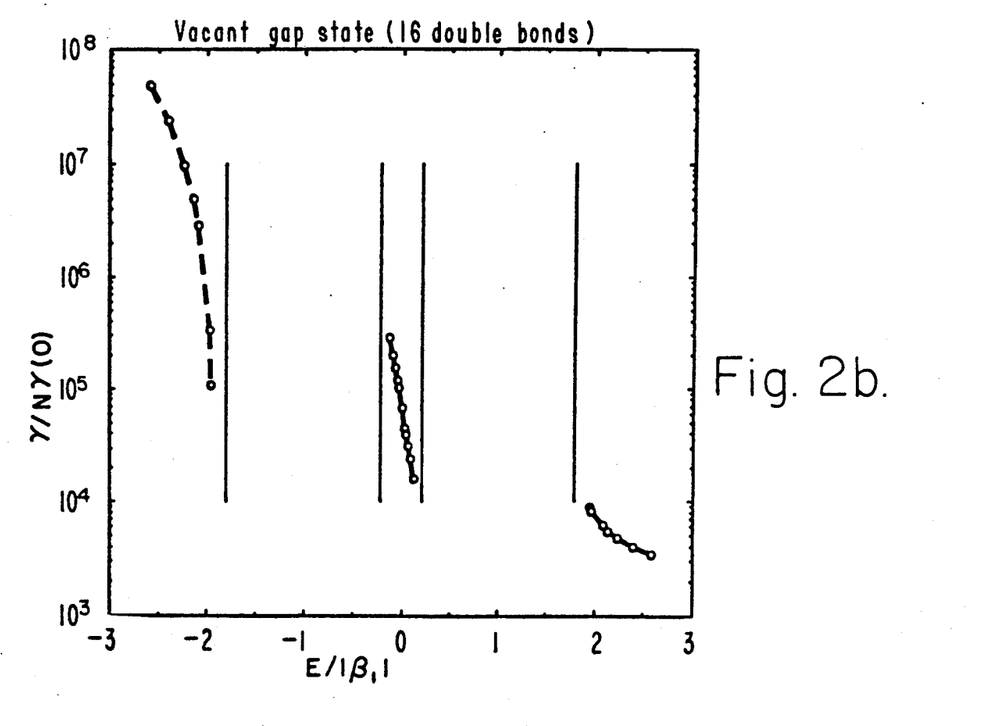
Figure 2C:
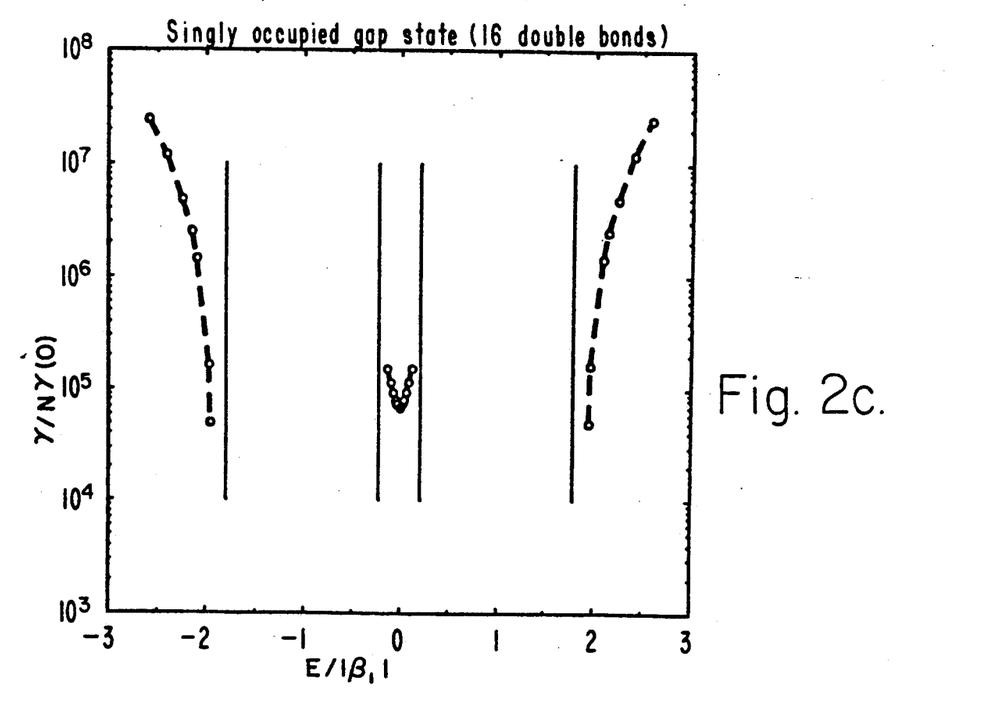
Figure 3A:
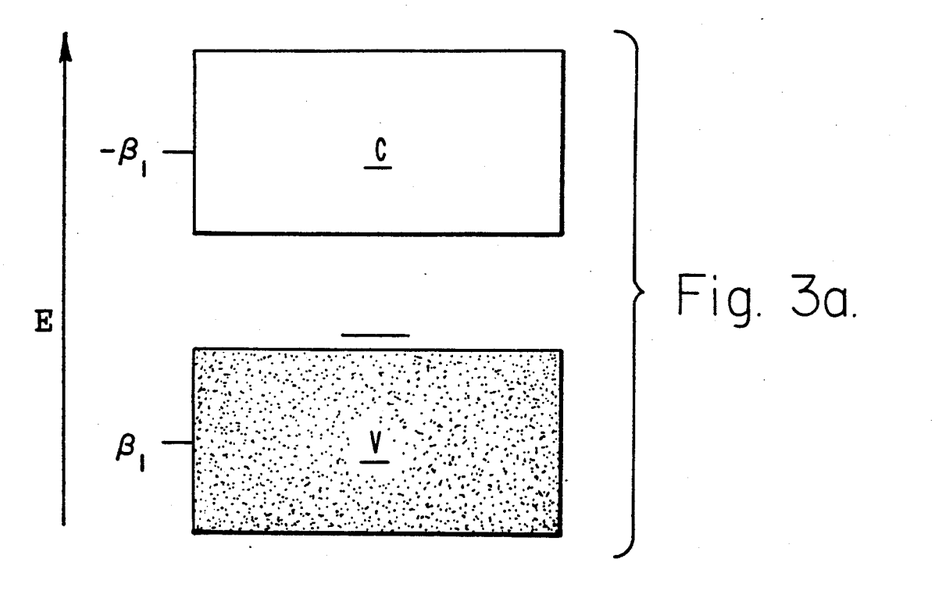
FIGS. 3a and 3b are schematic representations of energy states which give rise to increased hyperpolarizability.
Figure 3B:
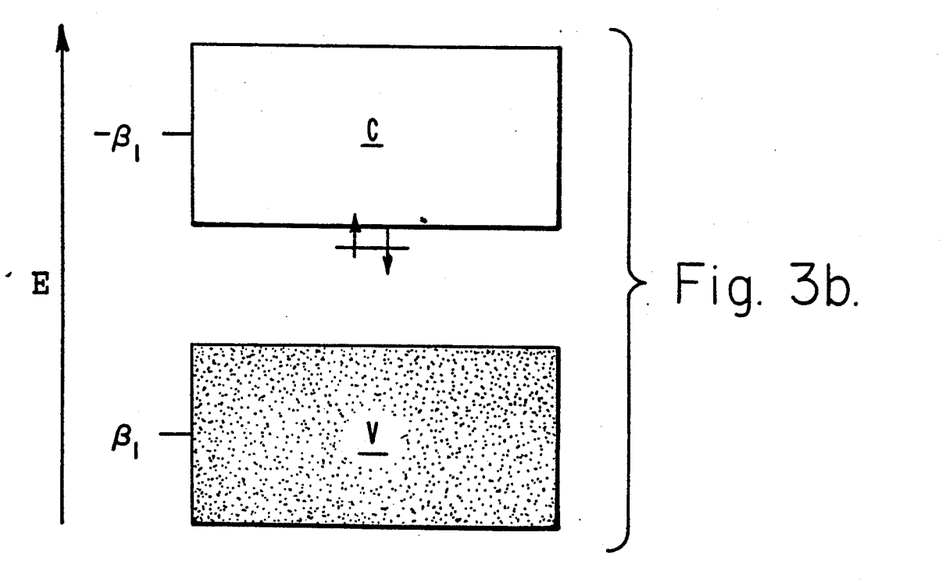

When a single carbon conjugation defect is introduced into a polyene chain, $\gamma'_{xxxx}$ is enhanced by about one order of magnitude (for long chains) or less and the sign is unchanged. The effect is independent (in this approximation) of the ionization state of the defect. Often, the coulomb energy of a defect site is parameterized to reflect the orbital occupancy, and this would eliminate the cancellation (see FIG. 2c). Non-carbon substituents can be incorporated in conjugated polymers and this would alter $\Delta$ as well. The potential enhancement of $\gamma'_{xxxx}$ for such materials is substantially larger. One might imagine chemically derivatizing the chain, resulting in a C—R bond at the point of attack. Alternatively, an atom in the chain might be purposefully replaced with a metal or heteroatom. Any of these cases would make the defect orbital energy ($\Delta$) not equal to zero.

There are four basic conjugated structures that may be benefited by the practice of the invention, as shown below. The first two structures (I and II) are polyene, while the last two structures (III and IV) are polyyne.

$-(C\equiv C-)_N X(-C\equiv C)_{N'}-$  III $-(C\equiv C-)_N D(-C\equiv C)_{N'}-$  IV
$\quad\quad\quad\quad\quad |$
$\quad\quad\quad\quad\quad A$ N and N' may be the same or different; thus, the position of X in the chain is not critical. N and N' each range from 0 to 40, and the total of N and N' ranges from 10 to 40.

X may be a heteroatom, a carbon defect (free radical), a benzene ring having an electron donor group thereon, such as tetrathiafulvalene (TTF), or an electron acceptor group thereon, such as cyano (—C≡N), a pyridine with its the nitrogen atom coordinated to a metal species acting as an electron donor or acceptor, platinum, palladium, or a stable free radical species, such as a nitroxide. If ruthenium, iron, or cobalt is used as the metal species, it may be tuned to a donor or acceptor by changing its oxidation state, as is well-known.

Structure II is a special case of Structure I, where X is replaced by the D-A moiety. "D" refers to donor, while "A" refers to acceptor. Similarly, Structure IV is a special case of Structure III.

Alternatively, the chain may be lightly doped; such doping is at a very low level so that no more than one doping event per chain exists. (If the chain is doped too highly, then the conjugation is disrupted.) The dopant may be one that contributes electrons or accepts electrons from the chain. Examples include $AsF_6$ and $I_2$.

Synthesis of any of the foregoing polymers is considered to be within the capabilities of those skilled in the art, and, accordingly, is not considered a part of this invention.

Figure 1:
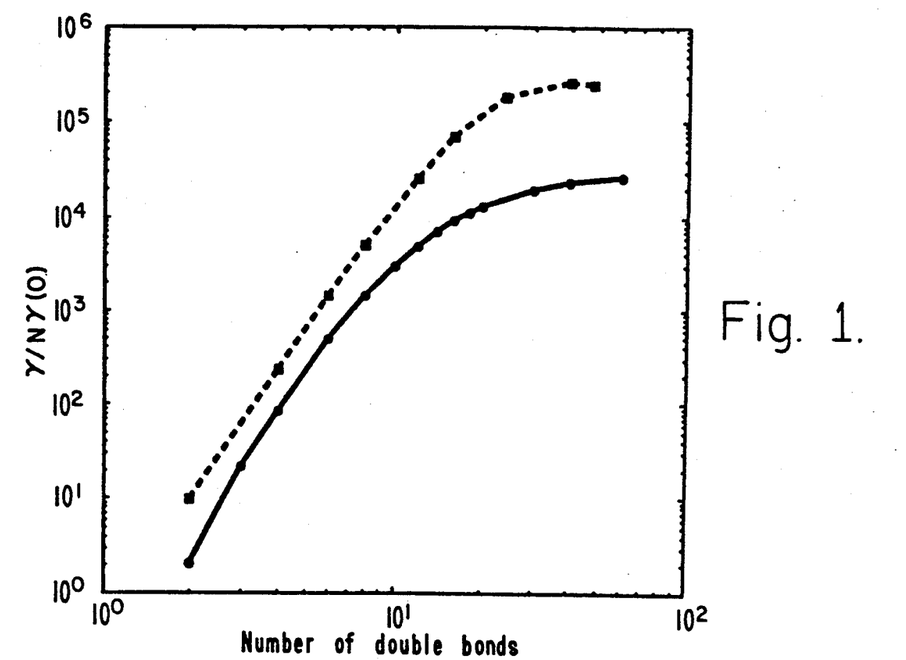
FIG. 1 is a plot, on coordinates of molecular hyperpolarizability density and chain length, of a polyene with N double bonds (solid line) and a polyene with N double bonds and a central conjugation defect (dashed line) in accordance with the invention.

Typical heteroatom substitutions (oxygen, nitrogen) change $\Delta$ to between 1 and 2 (in units of $\beta_1$). Such an atom inserted between two polyene segments is expected to cause a decrease in $\gamma'_{xxxx}$ relative to that of an uninterrupted polyene with the same number of double bonds (see FIG. 1, FIG. 2a, and Table 1, below).

TABLE 1

| Localized State Energy as a Function of $\Delta$. | |
|---|---|
| $\Delta/\beta_1$ | E(localized state)/$\beta_1$ |
| ±2.00 | ±2.58 |
| ±1.00 | ±1.97 |
| ±0.60 | ±0.129 |
| ±0.15 | ±0.035 |
| 0.00 | 0.00 |

The defect atom, as in the conjugation defect case, may have a variable number of electrons to interact with the hydrocarbon $\pi$ cloud. A nitrogen or oxygen free radical in conjugation with the polyene chain(s) is expected to cause an order of magnitude enhancement in $\gamma'_{xxxx}$ (see FIG. 2c). Similarly, conjugation of stable nitroxide radicals (typical spin labels) with polyenes might lead to analogous enhancements.

Other strategies for enhancing $\gamma'_{xxxx}$ would require the attachment of powerful electron "donors" or "acceptors" to the polyene (e.g., carotenes with 11 double bonds). By this is meant groups (donors) with filled energy levels close to the LUMO (lowest unoccupied molecular orbital) of the polyene or vacant energy levels (acceptors) close to HOMO (highest occupied molecular orbital) of the polyene. In contrast to the heteroatoms, these levels would provide localized states in the band gap (of opposite occupancy compared to the nearby band) or could actually reduce (or oxidize) the polyene to yield large hyperpolarizability enhancements. However, considerable loss of transparency well into the near infrared can result from one or two electron oxidation of carotenes. This will be determined by the degree of charge transfer from the carotene. One might expect that attachment of TTF (donor) or TCNQ (7,7,-8,8-tetracyanoquinodimethane; acceptor) or derivatives of TTF and/or TCNQ to provide such extreme levels. It is difficult to predict whether formal oxidation (or reduction) will actually occur in these materials based purely on the redox potentials because it is difficult to quantify the effect of ion paring in oxidized carotenes.

Another class of molecules of possible relevance is organometallics with low energy metal-to-liquid or ligand-to-metal charge transfer bands (MLCT or LMCT bands). These materials also would allow the tuning of the gap state orbital by selecting the oxidation state of the metal or the composition of its ligands. Consider the ruthenium tris(bipyridine) complex with polyene substituted bipyridine ligands, for example. One might expect this system to have relatively low energy charge transfer bands, with the direction of the charge transfer determined by the oxidation state of the metal. Hence, such systems might allow probing of the effect on $\gamma'_{xxxx}$ of the "defect" state proximity (defined by the oxidation state, ligand, and metal) to either the valence or conduction band.

In the existing literature, some discussion of the influence of real excited states on the time response and size of $\gamma'_{xxxx}$ has been given. Particular attention has been focused on the rise, evolution, and hyperpolarizability of the solitonic state of polyacetylene. The present invention sets forth a new class of transient large $\gamma'_{xxxx}$ materials that might be made based on molecules having finite excited state lifetimes. Molecules such as Structure II (and IV), in which a relatively long lived charge transfer excited state is created rapidly (picoseconds-microseconds), would create a transient state with particularly enhanced $\gamma'_{xxxx}$ provided that the charge transfer resulted in either (a) the creation of a partially occupied level very near the valence or conduction states of the polyene or (b) the transient oxidation or reduction of a large conjugated system. Structure II (and IV) is similar in many ways to the so-called "triad" molecules in which electron transfer from an excited porphyrin to a quinone results in transient charge transfer to a carotene molecule (making carotene+/—porphyrin/quinone—) which lives for milliseconds. Such a material would allow $\gamma'_{xxxx}$ to be switched between two different values. Prior to the creation of the charge transfer excited state, the value of $\gamma'_{xxxx}$ would be determined by FIG. 2a. Following excitation and charge transfer, and for the duration of the charge transfer excited state lifetime, the hyperpolarizability would be determined by FIG. 2c. Other examples of donor/acceptor pairs are $Ru^{II/III}L_n$ (L = nitrogen-containing ligand)/—methylviologne, or aniline/nitrobenzene. It is essential, of course, that the photochemistry yield only reversible oxidation/reduction of D, A or the extended conjugated sections of the molecule. Such a molecule could also be synthesized with both a large non-resonant first hyperpolarizability and switchable $\gamma'_{xxxx}$. An oriented assembly of such molecules would display different non-linear effects depending on the polarization of the incident light. The transient non-linearities of other delocalized excited states are also of great interest. Table 2 summarizes these predictions.

TABLE 2

Effects on $\gamma'_{xxxx}$ of Molecular Modifications

| Typical Molecule | $\gamma_{xxxx}$ Relative to Polyene |
|---|---|
| $(C=C-)_N O\!:\!(-C=C)_{N'}$ | decrease somewhat |
| $(C=C-)_N N\!:\!(-C=C)_{N'}$ | decrease somewhat |
| $(C=C-)_N C\!.\!(-C=C)_{N'}$ | increase somewhat |
| $(C=C-)_N N\!.\!(-C=C)_{N'}$ | increase somewhat |
| (examples: chemically doped materials, excited polyacetylene states) | |
| $(C=C-)_N X(-C=C)_{N'}$ | increase considerably* |
| $X^+\!\cdot\![(-C=C)_N]_2{}^-$ | increase considerably |
| $X^-\!\cdot\![(-C=C)_N]_2{}^+$ | increase considerably |
| (examples: organometallics with low energy MLCT or LMCT bands, i.e., where X is a strong electron donor or acceptor) | |
|  | increase considerably** |
| (example: electron transfer excited state, for example where D = porphyrin and A = quinone, reached by photoexcitation of D) | |

*Molecules with donors and acceptors at the chain end(s) are also expected to produce considerably enhanced hyperpolarizabilities.
**Either the charge transfer state or the ground state may evidence an increase in the hyperpolarizability.

Other experiments and theoretical work of possible relevance include studies of the hyperpolarizabilities of cyanine dyes. Cyanines might correspond crudely to the model of FIG. 2a, in which a low lying occupied state(s) (energy below the valence band of the pure polyene) causes a decrease in $\gamma'_{xxxx}$. The detailed connection between the molecule's electronic structure and the anharmonicity of the corresponding effective oscillator is still somewhat open and will undoubtedly be explored further in the future.

This semi-empirical method has been shown to produce quantitative predictions which are testable. Conjugation defects are predicted to enhance $\gamma'_{xxxx}$, at least in the low "defect" concentration limit, and will not change the sign of the hyperpolarizability. Oxidation or reduction of the polymer will cause sign changes and could cause large enhancements. The theory can be made more quantitative for specific molecules (e.g., Pd polyenes) by determining the energies and extinction coefficients of the "defect"-polyene charge transfer bands. Energetic trends for other free radical and spin paired "defects" have also been calculated. Placing localized electron states near bands of holes or localized holes near bands of electrons enhances $\gamma'_{xxxx}$ by enhancing delocalization of that localized state. Large transient changes may be achievable by creating transient charge separated states in a direction "orthogonal" to the direction of chain delocalization. Enhancements may also be produced by preparing delocalized excited states, thus simulating a 1-D metal-like susceptibility with the characteristic chain length dependence. As low lying charge transfer transitions are introduced, or as oxidation/reduction of bands occurs, significant loss of transparency may result. This problem may not be too severe in relatively short chain materials or materials in which the valence and conduction band widths are different.

The use of donor-acceptor pairs permits fabrication of optical switches using D-A moieties in the chain. Such a molecule is activated by light. The longer the duration of the charge separated state, the longer the changed hyperpolarizability will persist. One could go from a small hyperpolarizability to a larger value or vice versa.

EXAMPLES

Wittig reactions can be used to synthesize the species

Consequently, such reactions may be used to produce structures I and II, where N and N' are as defined earlier.

The Wittig reaction scheme is:

$RCH_2-X + P\phi_3 \rightarrow RCH_2 P\phi_3 X$

$RCH_2 P\phi_3 X + \text{base} \rightarrow RCH_2 = P\phi_3$ (ylide)

$RCH_2 = P\phi_3 + R'C(O)H \rightarrow R-C=C-R' + \phi_3 P=O,$ where X = halide and $\phi$ = phenyl. Thus, use of the appropriate aldehyde(s) and alkyl halide(s) permits forming the desired molecules.

For example, using retinal (available from Aldrich Chemical Company (Milwaukee, WI), Catalog No. 131, one may make the following molecule:

(electron acceptor)

(electron donor)

Examples of suitable aldehydes include the following compounds:

(electron acceptor)

Alternatively, the retinal may be used as the aldehyde to react with a different ylide:

R″—CH=Pφ₃ +

Thus, chains with six double bonds and a "defect"-group at the chain end can be formed (i.e., N or N′=0). This can be done by making an ylide reagent from retinal and reacting it with an aldehyde or by reacting unmodified retinal (itself an aldehyde) with an ylide.

Using a dialdehyde, similar chemistry may be used to put the "defect" in the chain center:

Analogously, a diylide may be made by:

Analogously, a diylide may be made by:

As an example of a pathway to a real molecule of interest:

In the final product, the quinone moiety is a strong electron acceptor.

Other examples of which may be useful include where R is the ylide (retinal, for example).

The defect can be modified by an alkylation reaction:

The species R' can be an alkyl chain or more complex group; this chemistry per se is well-known. For example, R' can be Another route to these molecules is where R is a donor or acceptor, such as —NO₂, —C≡N, or —N<.

Thus, there is disclosed a highly conjugated organic polymer having a changed hyperpolarizability. It will be apparent to those of skill in this art that various changes and modifications of an obvious nature may be made without departing from the spirit and scope of this invention, and all such changes and modifications are considered to fall within the ambit of the invention, as defined by the appended claims.

I claim:

1. A highly conjugated organic polymer having a changed hyperpolarizability, said polymer comprising a chain of alternating single and double bonds or alternating single and triple bonds, characterized by the presence of a moiety in the chain which donates or accepts electrons.

2. The polymer of claim 1 having a structure selected from the group consisting of

I

II

III

IV where X is selected from the group consisting of a heteroatom, carbon defect, a benzene ring having and electron donor or electron acceptor attached thereto, a pyridine with its nitrogen coordinated to a metal species acting as an electron donor or electron acceptor, platinum, palladium, and a stable free radical species, and where D is a donor moiety, A is an acceptor moiety, N and N' each range from 0 to 40, and the total of N and N' ranges from 10 to 40.

3. The polymer of claim 2 wherein said heteroatom is selected from the group consisting of oxygen and nitrogen.

4. The polymer of claim 3 having the structure

5. The polymer of claim 3 having the structure

6. The polymer of claim 3 having the structure

7. The polymer of claim 3 having the structure

8. The polymer of claim 2 wherein said metal species is selected from the group consisting of ruthenium, iron, and cobalt.

9. The polymer of claim 2 wherein D is selected from the group consisting of tetrathiafulvalene and porphyrin and wherein A is selected from the group consisting of 7,7,8,8-tetracyano-quinodimethane and quinone.

10. A method of increasing the second hyperpolarizability in a highly conjugated organic polymer, comprising introducing gap states with the appropriate energy in the polymer.

11. The method of claim 10 wherein said gap states are introduced by inserting a moiety in the chain which donates or accepts electrons.

12. The method of claim 11 wherein said polymer has a structure selected from the group consisting of

I

-continued

II

III

IV where X is selected from the group consisting of a heteroatom, carbon defect, a benzene ring having and electron donor or electron acceptor attached thereto, a pyridine with its nitrogen coordinated to a metal species acting as an electron donor or electron acceptor, platinum, palladium, and a stable free radical species, and where D is a donor moiety, A is an acceptor moiety, N and N' each range from 0 to 40, and the total of N and N' ranges from 10 to 40.

13. The method of claim 12 wherein said heteroatom is selected from the group consisting of oxygen and nitrogen.

14. The method of claim 13 having the structure

15. The method of claim 13 having the structure

16. The method of claim 13 having the structure

17. The method of claim 13 having the structure

18. The method of claim 12 wherein said metal species is selected from the group consisting of ruthenium, iron and cobalt.

19. The method of claim 12 wherein D is selected from the group consisting of tetrathiafulvalene and porphyrin and wherein A is selected from the group consisting of tetracyanoquinodimethane and quinone.

20. The method of claim 10 wherein said gap state is introduced by doping said polymer such that there is no more than one dopant event per polymer chain.

21. The method of claim 20 wherein said dopant is selected from the group consisting of $AsF_6$ and $I_2$.

22. The method of claim 10 wherein said gap states are introduced by synthesis of a conjugated polymer containing a photoexcitable species capable of reversibly transferring its electron to an acceptor.

23. An optical switch which is activated by light, said switch including a polymer having the structure selected from the group consisting of in the charge transfer state, and in the ground state.

* * * * *